(12) United States Patent
Douglas et al.

(10) Patent No.: US 8,713,551 B2
(45) Date of Patent: Apr. 29, 2014

(54) APPARATUS, SYSTEM, AND METHOD FOR NON-INTERRUPTIVELY UPDATING FIRMWARE ON A REDUNDANT HARDWARE CONTROLLER

(75) Inventors: Darren Christopher Douglas, Tucson, AZ (US); Jason James Graves, Tucson, AZ (US); Lei Liu, Tucson, AZ (US); David M. Morton, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 2266 days.

(21) Appl. No.: 11/324,594

(22) Filed: Jan. 3, 2006

(65) Prior Publication Data
US 2007/0174686 A1 Jul. 26, 2007

(51) Int. Cl.
G06F 9/44 (2006.01)
G06F 11/00 (2006.01)

(52) U.S. Cl.
USPC .......................................... 717/168; 714/12

(58) Field of Classification Search
USPC .......................................... 717/168; 714/12
See application file for complete search history.

(56) References Cited

U.S. PATENT DOCUMENTS

| | | | |
|---|---|---|---|
| 5,136,498 A * | 8/1992 | McLaughlin et al. ........... | 700/79 |
| 6,061,601 A | 5/2000 | Jansen et al. ..................... | 700/7 |
| 6,169,726 B1 | 1/2001 | Dempsey et al. ............. | 370/219 |
| 6,170,044 B1 * | 1/2001 | McLaughlin et al. ........ | 711/162 |
| 6,304,980 B1 * | 10/2001 | Beardsley et al. ................. | 714/6 |
| 6,327,670 B1 * | 12/2001 | Hellenthal et al. ................. | 714/5 |
| 6,449,725 B2 * | 9/2002 | Deenadhayalan et al. ..... | 713/324 |
| 6,622,302 B1 * | 9/2003 | Delaney et al. ............... | 717/170 |
| 6,675,258 B1 * | 1/2004 | Bramhall et al. ............. | 711/114 |
| 7,028,177 B2 * | 4/2006 | Schultz et al. ................ | 713/100 |
| 7,032,218 B2 * | 4/2006 | Shirasawa et al. ............ | 717/168 |
| 7,203,723 B2 * | 4/2007 | Ogawa .......................... | 709/203 |
| 7,240,188 B2 * | 7/2007 | Takata et al. ...................... | 713/1 |
| 7,809,993 B2 | 10/2010 | Bolan et al. | |
| 2001/0002193 A1 | 5/2001 | Fourie et al. .................. | 370/360 |
| 2002/0018442 A1 | 2/2002 | Okada .......................... | 370/227 |
| 2003/0126347 A1 | 7/2003 | Tan et al. ...................... | 710/313 |
| 2004/0019752 A1 * | 1/2004 | Burton et al. .................. | 711/154 |
| 2005/0160257 A1 * | 7/2005 | Kruger et al. ...................... | 713/2 |

* cited by examiner

*Primary Examiner* — Li B Zhen
*Assistant Examiner* — Hang Pan
(74) *Attorney, Agent, or Firm* — Kunzler Law Group

(57) ABSTRACT

An apparatus, system, and method are disclosed for non-interruptively updating firmware on a redundant hardware controller. The apparatus includes a routing module, a receiving module, and a forwarding module. The routing module routes communications between a redundant hardware controller and a service processor associated with a flash update. The receiving module receives a flash command for the flash update from the service processor via a shared serial connection. The forwarding module forwards the flash command via a dedicated point to point connection to the redundant hardware controller configured to receive the flash command over the point to point connection. The apparatus, system, and method provide a non-interruptive overlay of the firmware image on a redundant hardware controller, minimizing system downtime and user intervention.

20 Claims, 5 Drawing Sheets

APPARATUS, SYSTEM, AND METHOD FOR NON-INTERRUPTIVELY UPDATING FIRMWARE ON A REDUNDANT HARDWARE CONTROLLER

BACKGROUND

1. Field of Art

This invention relates to a primary hardware controller configured as a routing module associated with a firmware update and more particularly relates to forwarding a firmware update to a redundant hardware controller in order to avoid interrupting the operations of the primary hardware controller.

2. Background Technology

In a server environment that uses redundant hardware controllers sharing a single point to point connection, one controller may be referred to as the primary hardware controller and the other may be referred to as the secondary hardware controller. The primary hardware controller and the secondary hardware controller may connect to a service processor via a shared serial connection.

The primary hardware controller performs all operations associated with the redundant hardware controllers while the secondary hardware controller remains idle. The dedicated point to point connection is configured to duplicate and propagate status information and state changes from the primary hardware controller to the secondary hardware controller. In other words, in a normal operating mode, all writes to the memory of the primary hardware controller are transmitted via the dedicated point to point connection to the memory of the secondary hardware controller, thereby keeping the secondary hardware controller's memory and registers up to date, so that the secondary hardware controller can immediately assume control when required.

The shared serial connection is a connection shared by the primary hardware controller and the secondary hardware controller. However, the shared serial connection to the service processor can generally be controlled by one hardware controller at any given time. The hardware controller that actively controls the shared serial connection to the service processor is the primary hardware controller.

In a blade server environment, such as the IBM® BladeCenter blade servers, the primary hardware controller and secondary hardware controller may be substantially similar to a BMC (Baseboard Management Controller), a specialized microcontroller in communication with the motherboard of many computers, especially servers. And the service processor may be substantially similar to a MM (Management Module).

Slim, hot-swappable blade servers fit in a single chassis like books in a bookshelf, and each is an independent server, with its own processors, memory, storage, network controllers, operating system and applications. The blade server slides into a bay in a chassis and plugs into a mid- or backplane, sharing power, fans, floppy drives, switches, and ports with other blade servers. A blade server is designed to generate less heat and thus save energy costs. With switches and power units shared, space is freed up and blade servers enable higher computing resource density.

A blade server is sometimes referred to as a high-density server and is typically used in a clustering of servers that are dedicated to a single task, such as file sharing, web page serving and caching, SSL encrypting of web communication, transcoding of web page content for smaller displays and streaming audio and video content, etc. A blade server may have an operating system and the primary application program installed on the board.

The BMC manages the interface between the system management software of the MM and the server platform hardware via the shared serial connection. Different types of sensors built into a computer system report to the BMC on parameters such as temperature, cooling fan speeds, power mode, operating system (OS) status, etc. The BMC monitors the sensors and can send alerts to a system administrator via a communications network if any of the parameters do not remain within preset limits, indicating a potential failure of the system. The system administrator can also communicate with the BMC remotely to take such corrective actions as resetting or power cycling the system to get a hung OS running again. These abilities save on the total cost of ownership of a system.

One of the functions of the service processor or MM is to initiate flash updates on the primary hardware controller. To initiate the flash update, the service processor sends a flash start command to the primary hardware controller over a connection, essentially the shared serial connection. Conventionally, all flash updates are downloaded over the shared serial connection, or update connection. In response to receiving the flash start command from the service processor, the primary hardware controller stops executing routine hardware controller code and starts executing boot block code, which is a section of code that responds to and processes all flash commands sent from the service processor associated with a flash update. The primary hardware controller may complete or pause all current tasks while all future tasks may be stacked up in a queue.

During the firmware overlay process the update connection must remain owned exclusively by the target controller in order to transfer the firmware image. The update connection can not be shared or interrupted during the download or overlay. To complicate matters the primary hardware controller is not available to perform other tasks while the firmware image is downloading since the firmware overlay process requires the primary hardware controller to execute the boot block code. Thus, with the primary hardware controller code halted all hardware controller operations come to a halt.

Consequently, during the firmware overlay process, the server device is left without an active hardware controller which restricts the benefits of having redundant controllers. In addition to losing redundancy, server management uptime and hardware controller availability suffer as all tasks are queued until the firmware overlay process is complete.

In the continually evolving information age, one thing remains a constant: the need for 100% availability of mission-critical data and applications. Whether for stock markets, corporate payroll, e-commerce, enterprise databases, medical records, internet banking, or reasons of national security, the availability of these mission-critical resources depends directly on system uptime. Currently, there are no conventional procedures in place to suitably resolve the loss of hardware controller redundancy during the firmware overlay process.

From the foregoing discussion, it should be apparent that a need exists for an apparatus, system, and method that overcome the limitations of conventional flash update methods. In particular, such an apparatus, system, and method would beneficially reduce administrative workloads, thereby lowering total cost of ownership. The apparatus, system, and method would also beneficially minimize administrative intervention and maintain high availability to mission-critical data and applications.

SUMMARY

The several embodiments of the present invention have been developed in response to the present state of the art, and in particular, in response to the problems and needs in the art that have not yet been fully solved by currently available flash update methods. Accordingly, the present invention has been developed to provide an apparatus, system, and method for non-interruptively updating firmware on a redundant hardware controller that overcome many or all of the above-discussed shortcomings in the art.

The apparatus to update firmware is provided with a logic unit containing a plurality of modules configured to functionally execute the necessary operations for a non-interruptive update of firmware concurrent with other tasks and operations. These modules in the described embodiments include a routing module, a receiving module, and a forwarding module. Further embodiments include a determination module, an implementation module, a validation module, an acknowledgement module, and a write module.

The routing module routes communications associated with a flash update between the service processor and the secondary hardware controller. The routing module includes a receiving module, a forwarding module, and a determination module. The receiving module may receive flash update commands associated with a firmware overlay process from the service processor via the hardware control interface. In one embodiment, the receiving module may receive a flash command forwarded from the primary hardware controller to the secondary hardware controller via a state synchronization interface. Those of skill in the art will recognize that the routing module may route other types of communications and commands in addition to those relating to flash updates, within the scope of the present invention.

The forwarding module forwards a command such as a flash command from the service processor to the secondary hardware controller. When the receiving module receives a command such as a flash command from the service processor, the receiving module signals the forwarding module to forward the flash command via the state synchronization interface to the secondary hardware controller.

The determination module determines that a first hardware controller is a primary hardware controller in response to the primary hardware controller controlling (or having ownership of) the hardware control interface. In another embodiment, the determination module may determine whether a secondary hardware controller is operational in response to receiving the command such as the flash command from the service processor.

The implementation module may execute boot block code in response to receiving a flash start command via the state synchronization interface. When the receiving module receives a flash command from the primary hardware controller, the receiving module signals the implementation module to implement and execute boot block code on the secondary hardware controller. The implementation module includes a validation module, an acknowledgment module, and a write module.

The validation module validates a flash command associated with a firmware overlay process. The validation module may execute one or more cyclic redundancy checks or checksum algorithms, repetition schemes, parity schemes or any other similar error detection method on the flash command and/or a data block associated with a flash data command.

Once the validation module validates a flash command, and any associated data block, the acknowledgement module may acknowledge receipt of the validated flash command to the service processor. In one embodiment, the acknowledgement module may request that the service processor resend an invalid flash command.

The write module writes a data block associated with a flash data command to the memory device. In one embodiment, the write module writes the data block sequentially to a buffer where the complete firmware image is assembled and then later loaded into the firmware.

The fail module may send a failure message to the service processor in association with a flash update command. When the determination module determines that secondary hardware controller is non-operational, the fail module fails the flash update command. When the validation module determines that a flash update command is invalid, the fail module may send a negative acknowledgment to the service processor via the state synchronization interface.

The termination module may complete a firmware overlay process in response to the secondary hardware controller receiving a flash end command via the state synchronization interface. In one embodiment, the termination module may switchover control of the hardware control interface from the primary hardware controller to the secondary hardware controller, such that the primary hardware controller 102 and the secondary hardware controller 102 switch roles.

A system of the present invention is also presented to non-interruptively update firmware on a redundant hardware controller. The system may be embodied in a redundant hardware controller, the redundant hardware controller configured to execute a firmware overlay process.

In particular, the system, in one embodiment, may include a management module configured to execute a firmware overlay process, a primary baseboard management controller configured to route a flash update in response to the management module executing the firmware overlay process and forward the flash update to a redundant hardware controller, a secondary baseboard management controller configured to receive the flash update from the primary baseboard management controller over a point to point connection.

The system also includes an update module in communication with the primary baseboard management controller and the secondary baseboard management controller, the update module is configured to non-interruptively replace a current firmware image stored on the secondary baseboard management controller with the flash update.

In a further embodiment, the system may include a memory device, the memory device may be configured to store a data block associated with a flash data command. The system may also include an indirect routing connection that couples the management module, the primary baseboard management controller and the secondary baseboard management controller, the indirect routing connection is configured to transmit and receive a flash command between the management module and the secondary baseboard management controller through the primary baseboard management controller.

A signal bearing medium is also presented to store a program that, when executed, performs operations to non-interruptively update firmware on or issue control commands to a redundant hardware controller. In one embodiment, the operations include receiving a flash command from a service processor via an indirect routing connection, determining whether a secondary hardware controller is operational in response to receiving the flash command, and forwarding the flash command from the service processor to the secondary hardware controller via the indirect routing connection.

In another embodiment, the operations may include executing boot block code in response to receiving the flash command that comprises a flash start command via the indirect routing connection, forwarding an acknowledgement from the secondary hardware controller to the service processor in response to receipt of the flash command, and completing a firmware overlay process of the secondary hardware controller in response to receipt of a flash command that comprises a flash end command.

In a further embodiment, the operations may include determining that a redundant hardware controller is a primary hardware controller in response to the primary hardware controller controlling a shared serial connection to the service processor, validating the flash command, writing a validated data block associated with the flash command to a firmware storage location on the secondary hardware controller, acknowledging receipt of the flash command, sending a failure message to the service processor in response to a determination that the secondary hardware controller is non-operational and sending a negative acknowledgment to the service processor in response to a determination that the flash command is invalid.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

These features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

Figure 1:
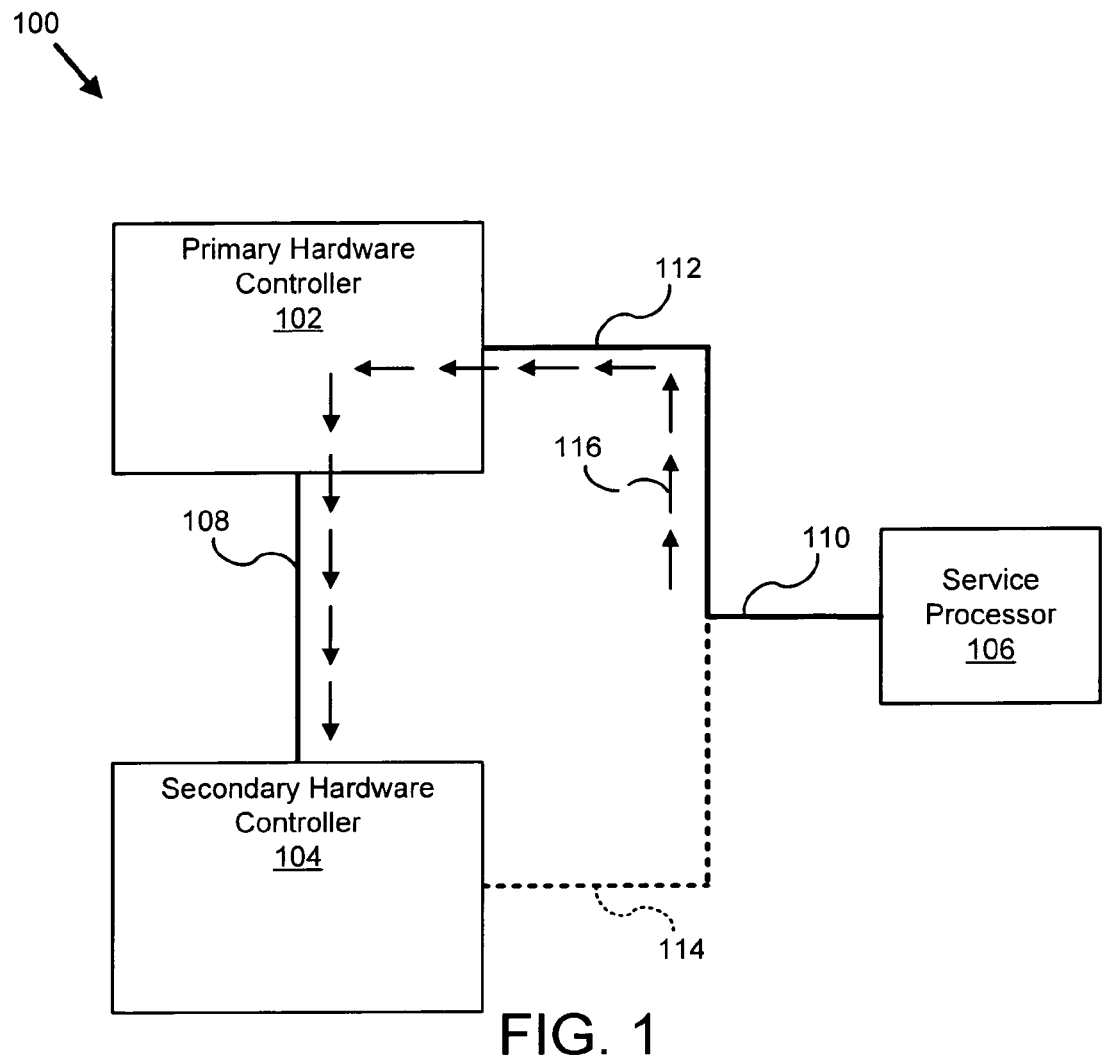
FIG. 1 is a schematic block diagram illustrating one embodiment of a computer management system.

FIG. 1 depicts a schematic block diagram of one embodiment of a computer management system 100. The computer management system 100 monitors the state of the platform hardware and provides remote access to control platform hardware, retrieve state information and receive notifications about critical errors and other hardware state changes. The computer management system 100 includes a primary hardware controller 102, a secondary hardware controller 104, a service processor 106, a state synchronization interface 108, a hardware control interface 110, and an indirect routing connection 116. The computer management system 100 may manage the status of hardware components according to the management operations of the primary hardware controller 102, the secondary hardware controller 104, and the service processor 106. In one embodiment, the computer management system 100 may include two or more hardware controllers.

The primary hardware controller 102 manages the interface between the system management software of the service processor 106 and the platform hardware via the hardware control interface 110. The primary hardware controller 102 may monitor the platform hardware and system parameters of a blade server (not shown). In one embodiment, the primary hardware controller 102 may route a flash update to the secondary hardware controller 104 via the state synchronization interface 108.

In one embodiment, the secondary hardware controller 104 is a redundant hardware controller to the primary hardware controller 102. The secondary hardware controller 104 may be configured as a hot-backup of the primary hardware controller 102. The secondary hardware controller 104 may alternatively be configured as a peer controller, sharing a workload with the primary hardware controller 102. The secondary hardware controller 104 may be a slave controller to the primary hardware controller 102 that is configured as a master controller, the secondary hardware controller 104 executing commands from the primary hardware controller 102. In one embodiment, the secondary hardware controller 104 receives a flash update from the primary hardware controller 102 via the state synchronization interface 108

The service processor 106 processes requests from the computer management system 100. The service processor 106 comprises system management software that allows a system administrator to manage the state and operation of platform hardware via the primary hardware controller 102 and/or the secondary hardware controller 104. The service processor 106 may be configured to control the management of platform hardware and the monitoring of system parameters of the computer management system 100.

In one embodiment, the service processor 106 may be a command line interface (CLI) application executing on a remote computer system. Preferably, a system administrator may initiate a flash update via the service processor 106. The service processor 106 may be local to the primary hardware controller 102 and secondary hardware controller 104 or remotely connected via the hardware control interface 110.

The state synchronization interface 108 duplicates and propagates status information and state changes of the computer management system 100 from the primary hardware controller 102 to the secondary hardware controller 104. The state synchronization interface 108 interconnects the primary hardware controller 102 to the secondary hardware controller 104. In one embodiment, the state synchronization interface 108 may be a dedicated point to point connection.

The hardware control interface 110 communicates state management messages between the primary hardware controller 102 and/or the secondary hardware controller 104 and the service processor 106. The hardware control interface 110 is a shared connection that is shared between the primary hardware controller 102 and the secondary hardware controller 104. The hardware control interface 110 may comprise a serial or a parallel communication path. In certain embodiments, the hardware control interface 110 comprises a single wire physically connecting the service processor 106 to the primary hardware controller 102 and the secondary hardware controller 104. Preferably, the communication between the service processor 106 and primary hardware controller 102 or secondary hardware controller 104 follows a protocol which permits one controller to have ownership of the hardware control interface 110, while the other controller agrees not to send any messages over the hardware control interface 110 unless it is the owner. In this manner, the primary hardware controller 102 and secondary hardware controller 104 can cooperative share a single connection.

The hardware control interface 110 comprises a primary hardware control link 112 and a secondary hardware control link 114. In one embodiment, the hardware controller that currently controls the hardware control interface 110 is the primary hardware controller 102. The primary hardware control link 112 illustrates which hardware controller 102,104 is currently the primary hardware controller 102. The secondary hardware control link 114 (illustrated by a dashed line) illustrates which hardware controller 102,104 is currently the secondary hardware controller 104.

The primary hardware control link 112 communicates state management messages between the primary hardware controller 102 and the service processor 106 via the hardware control interface 110. The secondary hardware control link 114 provides a redundant path to a hardware controller 102, 104 such that the secondary hardware controller 104 can take over upon failure of the primary hardware controller 102.

The state synchronization interface 108 and/or hardware control interface 110, in certain embodiments, may be implemented as a serial connection such as inter-integrated circuit ($I^2C$) bus, recommended standard-232 (RS232), recommended standard-422 (RS422), recommended standard-423 (RS423), recommended standard-485 (RS485), universal serial bus (USB), institute of electrical and electronic engineers standard 1394 (IEEE 1394), or any other similar interface. As will be recognized by those of skill in the art, the state synchronization interface 108 and/or hardware control interface 110 may be implemented in host bus environments such as small computer system interface (SCSI), internet small computer system interface (iSCSI), serial advanced technology attachment (SATA), common internet file system (CIFS), network file system (NFS/NetWFS), fiber connection (FICON), enterprise systems connection (ESCON), or any other similar interface.

Traditionally, flash updates were sent directly to the primary hardware controller 102 over hardware control interface 110. However, sending the flash update directly to the primary hardware controller 102 had the adverse effect of taking the primary hardware controller 102 offline, and disrupting current and future tasks of the primary hardware controller 102 for the duration of the firmware overlay process. The indirect routing connection 116 allows the primary hardware controller 102 to remain online and process other tasks while routing flash updates from the service processor 106 to the secondary hardware controller 104.

The indirect routing connection 116 provides the computer management system 100 an indirect connection between the secondary hardware controller 104 and the service processor 106. In one embodiment, the indirect routing connection 116 may be a path that comprises the hardware control interface 110, the primary hardware control link 112, the primary hardware controller 102, and the state synchronization interface 108. In one embodiment, the primary hardware controller 102 may route flash commands associated with a flash update from the service processor 106 to the secondary hardware controller 104 via the indirect routing connection 116. In certain embodiments, the computer management system 100 may use the indirect routing connection 116 for power-cycling or fencing of the secondary hardware controller 104, as well as other similar management procedures in addition to flash updates. The indirect routing connection 116 permits the service processor 106 to concurrently interact with the primary hardware controller 102 and perform certain functions on the secondary hardware controller 104 even though the secondary hardware controller 104 does not own the hardware control interface 110.

One benefit of performing a flash update on one of the controllers through the indirect routing connection 116 is that the firmware overlay process may be executed with no changes to the current management software loaded on the service processor 106. The system administrator may simply need to know that the firmware update commands sent to the primary hardware controller 102 are dynamically re-routed by that primary hardware controller 102 to the secondary hardware controller 104. Accordingly, the system administrator may perform a flash update on the secondary hardware controller 104 then switch ownership of the hardware control interface 110 and perform a flash update on the primary hardware controller 102 which has become the secondary hardware controller 104 due to the switch.

The indirect routing connection 116 may be an indirect and longer path to the target hardware controller than the conventional update path. However, the indirect routing connection 116 takes advantage of the inherent redundancy of the primary hardware controller 102 and the secondary hardware controller 104, allowing the computer management system 100 to maintain state management uptime and freeing the primary hardware controller 102 to execute other tasks as required.

Figure 2:
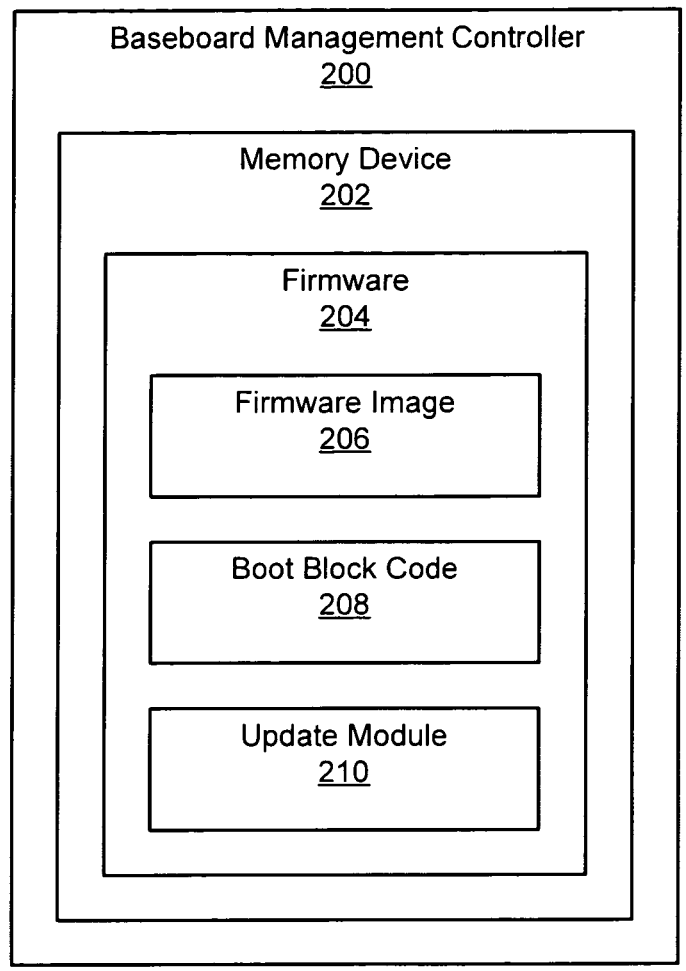
FIG. 2 is a schematic block diagram illustrating one embodiment of a baseboard management controller.

FIG. 2 depicts one embodiment of a baseboard management controller 200. The baseboard management controller 200 includes a memory device 202. The baseboard management controller 200 may be substantially similar to the primary hardware controller 102 and the secondary hardware controller 104 of FIG. 1. The memory device 202 may act as a task buffer to increase the task performance ability of the baseboard management controller 200, as well as store microcode programmed to operate the baseboard management controller 200.

The memory device 202 includes firmware 204 that may be stored on a non-volatile semiconductor or other similar memory device. The memory device 202 may comprise one or more non-volatile semiconductor devices, such as a flash memory, static random access memory (SRAM), non-volatile random access memory (NVRAM), electrically erasable programmable read-only memory (EEPROM), erasable programmable read only memory (EPROM), NAND/AND, NOR, divided bit-line NOR (DINOR), or any other similar memory device.

Many of the operations of the baseboard management controller 200 are determined by the execution of the firmware 204. The firmware 204 includes a firmware image 206, a boot block code 208, and an update module 210. In general, the update module 210 may implement a firmware overlay process. One example of the update module 210 is shown and described in more detail with reference to FIG. 3.

The firmware image 206 may be a data structure containing machine instructions and data, which can be loaded into the baseboard management controller 200 and executed. In one embodiment, the normal operating functions of the baseboard management controller 200 derive from booting the firmware image 206 on the baseboard management controller 200.

Like the firmware image 206, the boot block code 208 may be a data structure containing machine instructions and data, which can also be loaded into the baseboard management controller 200 and executed. However, whereas the firmware image 206 comprises machine instructions and data for the normal operating function of the baseboard management controller 200, the boot block code 208 may comprise specialized machine instructions and data that respond to and process a flash command associated with a flash update sent from the service processor 106.

The service processor 106 may send a plurality of flash commands. In order to initiate the flash update, the service processor 106 may send a flash start command. The flash start command notifies the primary hardware controller 102 that a new firmware image 206 is to be downloaded and flashed to memory 202. In certain embodiments, the new firmware image 206 may be a complete replacement of the current firmware image 206 or may be a patch to a block of the current firmware image 206. In one embodiment, the service processor 106 may determine whether the target baseboard management controller has the latest firmware image 206 already loaded.

In order to transfer a data block from the management controller 102 to the target baseboard management controller, the management controller 102 may send a flash data command. The data block is a single transferable portion of a complete firmware image 206. In order to terminate a flash update, the service processor 106 may send a flash end command. The flash end command is a command that notifies the primary hardware controller 102 that the last data block of the new firmware image 206 has been sent and the firmware overlay process is complete.

Instead of the primary hardware controller 102 executing the boot block code 208 when a flash start command is received from the service processor 106, in one embodiment, the primary hardware controller 102 may send a flash command from the service processor 106 to the secondary hardware controller 104. In this manner, the primary hardware controller 102 serves as a proxy for the service processor 106 in communicating or routing a flash update to the secondary hardware controller 104. The secondary hardware controller 104 begins executing the boot block code 208 when the flash command is received from the primary hardware controller 102 via the state synchronization interface 108.

The firmware overlay process is complete once the secondary hardware controller 104 receives a flash end command from the primary hardware controller 102 via the state synchronization interface 108, and the secondary hardware controller 104 acknowledges a successful flash update. The secondary hardware controller 104 then reboots and begins executing the new firmware image 206.

A switchover between the primary hardware controller 102 and the secondary hardware controller 104 may then take place. A switchover is a swap in the roles between the primary hardware controller 102 and the secondary hardware controller 104. Thus, control and utilization of the hardware control interface 110 may switch over from the primary hardware controller 102 to the secondary hardware controller 104.

The secondary hardware controller 104 takes over the operations and other tasks of the primary hardware controller 102 and is given active ownership of the hardware control interface 110. Therefore, the secondary hardware controller 104 becomes the primary hardware controller 102. The primary hardware controller 102 begins maintaining and receiving redundant status management via the state synchronization interface 108, and thus becomes the secondary hardware controller 104. In one embodiment, a system administrator may switchover the primary hardware controller 102 with the secondary hardware controller 104 upon completion of a successful flash update of the firmware image 206 on the secondary hardware controller 104.

Once the switchover is completed, the new secondary hardware controller 104 may receive a flash start command from new primary hardware controller 102, wherein the firmware image 206 of the new secondary hardware controller 104 may be replaced with the new firmware image 206. Thus, the flash update of both hardware controllers is achieved while a primary hardware controller 102 maintains active state management and executes other tasks concurrently throughout the firmware overlay process. Once the firmware overlay process of the new secondary hardware controller 104 is complete, in one embodiment, a switchover between the primary hardware controller 102 and the secondary hardware controller 104 may be executed again so that the original primary hardware controller 102 may then operate with the updated firmware image 206 and regain control the hardware control interface 110 without interrupting the workload or workflow.

Figure 3:
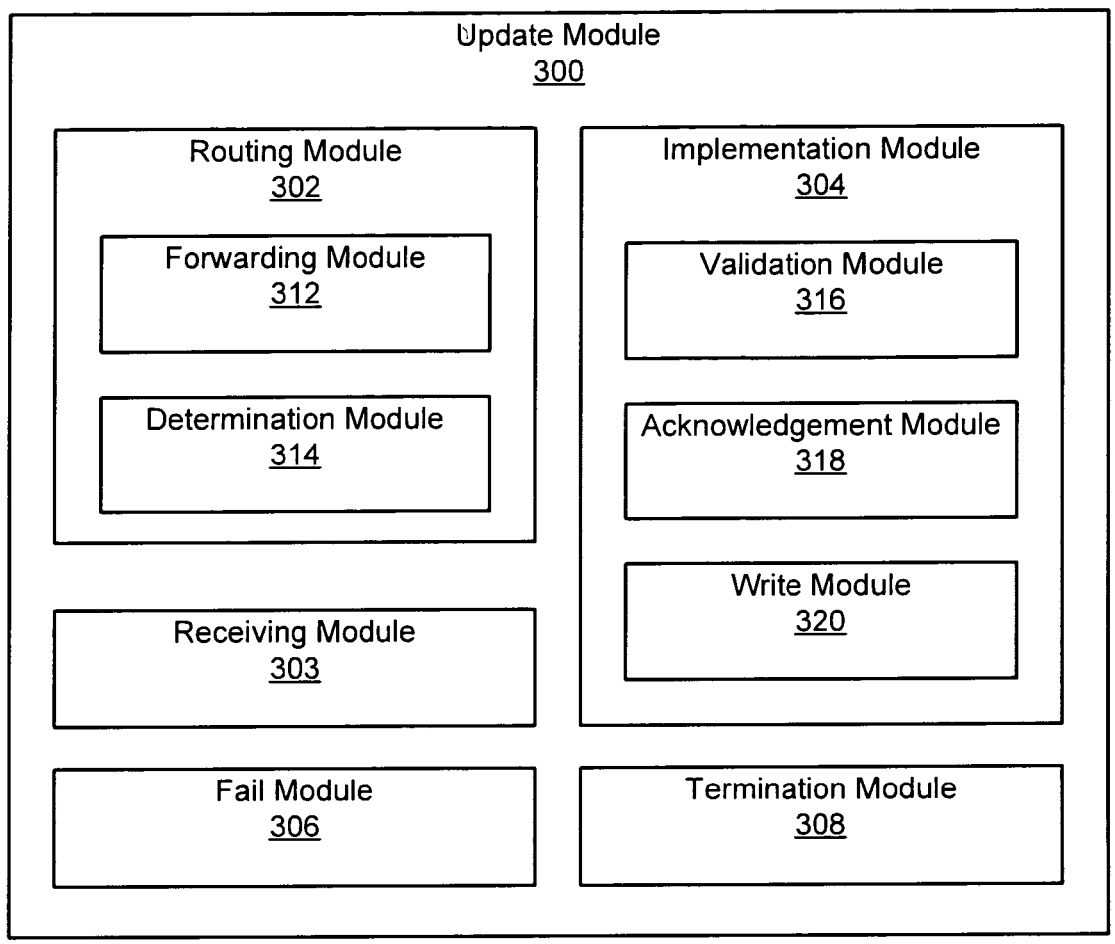
FIG. 3 is a schematic block diagram illustrating one embodiment of a update module.

FIG. 3 depicts one embodiment of an update module 300 that may be substantially similar to the update module 210 of FIG. 2. The update module 300 includes a routing module 302 that routes communications between the service processor 106 and the secondary hardware controller 104, a receiving module 303 that receives flash update commands, an implementation module 304 that implements a firmware overlay process in association with the secondary hardware controller 104, a fail module 306 that may signal a failure in association with a flash update command, and a termination module 308 that terminates the firmware overlay process.

The update module 300 may be activated according to a proxy update protocol. The proxy update protocol may establish the manner in which the primary hardware controller 102 may receive and forward a flash command from the service processor 106, and the manner in which the secondary hardware controller 104 receives and executes a flash command from the primary hardware controller 102.

The routing module 302 routes communications associated with a flash update between the service processor 106 and the secondary hardware controller 104. The routing module 302 includes a forwarding module 312 that forwards flash update commands, and a determination module 314 that determines whether a flash overlay process may begin. The routing module 302 may route communications associated with a flash update between a secondary hardware controller 104 and a service processor 106.

The receiving module 303 receives flash update commands associated with a firmware overlay process from the service processor 106 via the hardware control interface 110. The receiving module 303 may receive a flash command sent from the service processor 106 to the primary hardware controller 102 via the hardware control interface 110. The receiving module 303 may also receive a flash command forwarded from the primary hardware controller 102 to the secondary hardware controller 104 via the state synchronization interface 108. Preferably, the receiving module 303 is configured to listen or respond to flash commands or other types of control commands received via the hardware control interface 110 or the state synchronization interface 108.

The forwarding module 312 forwards a command such as a flash command from the service processor 106 to the secondary hardware controller 104. When the receiving module 303 receives a flash command from the service processor 106 via the hardware control interface 110, the receiving module 303 signals the forwarding module 312 to forward the flash command via the state synchronization interface 108 to the secondary hardware controller 104. A receiving module 303 of the secondary hardware controller 104 may recognize and receive the flash command over the state synchronization interface 108. Thus, the flash command initiated by the service processor 106 is received and forwarded to the secondary hardware controller 104 by the primary hardware controller 102 over the indirect routing connection 116.

The determination module 314 determines that a first hardware controller is a primary hardware controller 102 in response to the primary hardware controller 102 controlling the hardware control interface 110. In another embodiment, the determination module 314 may determine whether a secondary hardware controller 104 is operational in response to receiving the flash command from the service processor 106. The determination module 314 cooperates with the forwarding module 312. In one embodiment, if the hardware controller containing the determination module 314 is the primary hardware controller 102 and the secondary hardware controller 104 is operational, the determination module 314 signals the forwarding module 312 to have the command such as a flash command forwarded. In certain embodiments, the determination module 314 may simply expect that the secondary hardware controller 104 is operational.

The implementation module 304 implements boot block code 208 in response to receiving a flash start command via the state synchronization interface 108. When the receiving module 303 receives a flash start command from the primary hardware controller 102, the receiving module 303 signals the implementation module 304 to implement and execute boot block code 208 on the secondary hardware controller 104. The implementation module 304 may include a validation module 316 that validates a flash update command, an acknowledgment module 318 that acknowledges a flash update command, and a write module 320 that writes a data block associated with a flash update command to memory.

The validation module 316 validates a flash command associated with a firmware overlay process. In one embodiment, the validation module 316 validates a data block associated with a flash data command. The validation module 316 may execute of one or more cyclic redundancy checks or checksum algorithms, repetition schemes, parity schemes or any other similar error detection method on the flash command and/or a data block associated with a flash data command.

Once the validation module 316 validates a command such as a flash command or an associated data block, the acknowledgement module 318 may acknowledge receipt of the validated flash command to the service processor 106. In one embodiment, the acknowledgement module 318 may acknowledge every flash command associated with a flash update. In a further embodiment, the acknowledgement module 318 may request that the service processor 106 resend a flash command found to be invalid.

The write module 320, in one embodiment, writes a data block associated with a flash data command. In one embodiment, the write module 320 writes the data block associated with the flash data command to the memory device 202. In another embodiment, the write module 320 writes the data block sequentially to a buffer (not shown) where the complete firmware image 206 is assembled and then later loaded into the firmware 204.

The fail module 306 may send a failure message to the service processor 106 in association with a flash update command. When the determination module 314 determines that a secondary hardware controller 104 is non-operational, the fail module 306 fails the flash update command by sending a failure message to the service processor 106. The primary hardware controller 102 may then wait for the secondary hardware controller 104 to come back online or may fail the firmware overlay process. When the validation module 316 determines that a flash update command is invalid, the fail module 306 may send a negative acknowledgment to the service processor 106 via the state synchronization interface 108. The service processor 106 may then resend the flash update command that failed.

The termination module 308 may complete a firmware overlay process in response to the secondary hardware controller 104 receiving a flash end command via the state synchronization interface 108. In one embodiment, the termination module 308 may switchover control of the hardware control interface 110 from the primary hardware controller 102 to the secondary hardware controller 104, such that the primary hardware controller 102 and the secondary hardware controller 104 switch roles.

Figure 4:
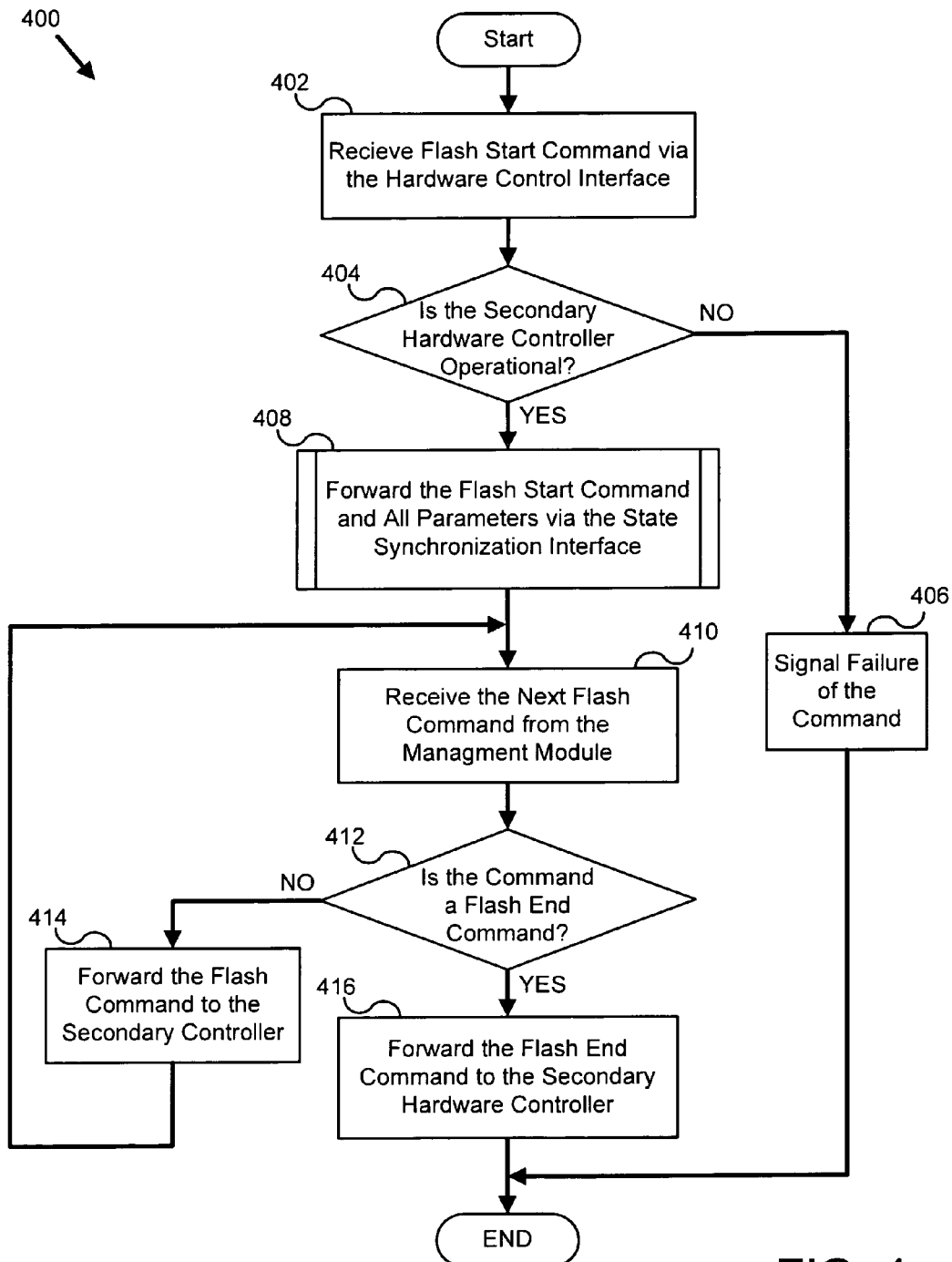
FIG. 4 is a schematic flow chart diagram illustrating one embodiment of a firmware routing method.

FIG. 4 is a schematic flow chart diagram that depicts one embodiment of a firmware routing method 400 that may be implemented by the update module 300 of FIG. 3. The firmware routing method 400 is described herein with reference to the computer management system 100 of FIG. 1. Although the firmware routing method 400 is depicted in a certain sequential order, for purposes of clarity, the computer management system 100 may perform the operations in parallel and/or not necessarily in the depicted order. In one embodiment, the firmware routing method 400 is executed in association with the primary hardware controller 102.

The firmware routing method 400 starts and the receiving module 303 receives 402 a flash start command from the service processor 106 via the hardware control interface 110. Preferably, the hardware control interface 110 is an interface that is shared by a primary hardware controller 102 and a secondary hardware controller 104. Next, the determination module 314 determines 404 whether the secondary hardware controller 104 is operational. If the determination module 314 determines 404 that the secondary hardware controller 104 is non-operational, the fail module 306 proceeds to signal 406 failure of the flash start command.

Conversely, if the determination module 314 determines 404 that the secondary hardware controller 104 is operational, the forwarding module 312 forwards 408 the flash start command and all related parameters to the secondary hardware controller 104 via the state synchronization interface 108. Next, the receiving module 303 receives 410 the next flash command from the service processor 106.

In response to the receiving module 303 receiving 410 the next flash command, the determination module 314 may determine 412 whether the flash command comprises a flash end command. If the determination module 314 determines 412 that the flash command does not comprise a flash end command, the forwarding module 312 forwards 414 the flash command to the secondary hardware controller 104. On the contrary, if the determination module 314 determines 412 that the flash command does comprise a flash end command, the forwarding module 312 forwards 416 the flash end command to the secondary hardware controller 104. The primary hardware controller 102 may then wait for another command from the service processor 106.

Following the secondary hardware controller 104 receiving the flash end command, in one embodiment, the primary hardware controller 102 may be switched over with the secondary hardware controller 104. In other words, control of the hardware control interface 110 is taken from the primary hardware controller 102 and given to the secondary hardware controller 104. Thus, the firmware overlay process may be repeated to update the primary hardware controller 102.

Figure 5:
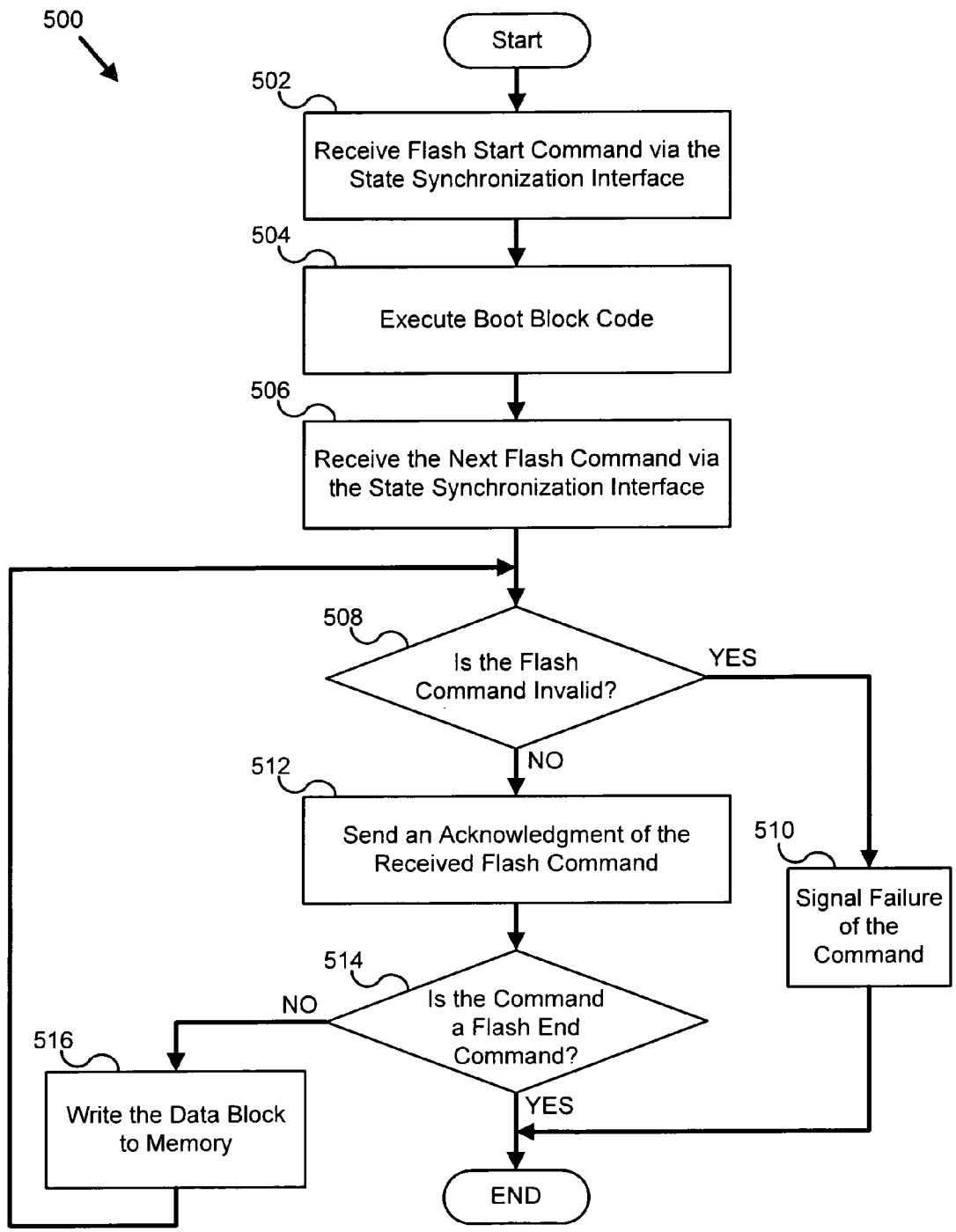
FIG. 5 is a schematic flow chart diagram illustrating one embodiment of a firmware update method.

FIG. 5 is a schematic flow chart diagram illustrating one embodiment of a firmware update method 500 that may be implemented by the update module 300 of FIG. 3. The firmware update method 500 is described herein with reference to the computer management system 100 of FIG. 1.

The firmware update method 500 includes operations to receive 502 a flash start command, implement 504 boot block code 208, receive 506 the next flash command, determine 508 whether the flash command is invalid, signal 510 failure of the flash command, send 512 an acknowledgment, determine 514 whether the flash command comprises a flash end command, and write 516 the data block associated with a firmware overlay process.

The firmware update method 500 initiates the firmware update abilities of the update module 300 associated with the secondary hardware controller 104. Although the firmware update method 500 is depicted in a certain sequential order, for purposes of clarity, the computer management system 100 may perform the operations in parallel and/or not necessarily in the depicted order. In one embodiment, the firmware update method 500 is executed in association with the secondary hardware controller 104.

The firmware update method 500 starts and the receiving module 303 receives 502 the flash start command via the state synchronization interface 108. Next, the implementation module 304 executes 504 boot block code 208 on the secondary hardware controller 104. In one embodiment, the secondary hardware controller 104 stops the booted firmware image 206 currently executing, and starts executing boot block code 208.

Following the initiation of boot block code 208, the receiving module 303 receives 506 the next flash command via the state synchronization interface 108. The validation module 316 then determines 508 whether the flash command is invalid. If the firmware update method 500 determines 508 that the flash command is invalid, the fail module 306 signals 510 a failure of the current flash command. In one embodiment, the fail module 306 may send a request for the service processor 106 to resend the flash command that the validation module 316 determined 508 to be invalid.

Conversely, if the firmware update method 500 determines 508 that the flash command is valid, the acknowledgement module 318 may send 512 an acknowledgement of the receipt of a valid flash command.

Next, the determination module 314 may determine 514 whether the flash command comprises a flash end command. If the determination module 314 determines that the flash command does not comprise a flash end command, the write module 320 writes 516 the data block associated with a flash data command to the memory device 202.

On the contrary, if the determination module 314 determines 514 that the flash command does comprise a flash end command, the termination module 308 may complete the firmware overlay process. As described above, the termination module 308, in certain embodiments, may then automatically switchover control of the hardware control interface 110 from the primary hardware controller 102 with the secondary hardware controller 104 in order to repeat the firmware overlay process for the primary hardware controller 102.

The firmware overlay process imparted by the present invention can have a positive impact on overall system performance. In certain embodiments, the present invention improves uptime, application availability, and real time business performance, all of which results in driving lower the total cost of ownership. In addition to updating a firmware image 206 on a redundant hardware controller, embodiments of the present invention afford the system administrator the ability to update a firmware image 206 without interrupting the tasks of the primary hardware controller 102.

The schematic flow chart diagrams included herein are generally set forth as logical flow chart diagrams. As such, the depicted order and labeled operations are indicative of one embodiment of the presented method. Other operations and methods may be conceived that are equivalent in function, logic, or effect to one or more operations, or portions thereof, of the illustrated method. Additionally, the format and symbols employed are provided to explain the logical operations of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated operations of the depicted method. Additionally, the order in which a particular method occurs may or may not strictly adhere to the order of the corresponding operations shown.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Reference to a signal bearing medium may take any form capable of generating a signal, causing a signal to be generated, or causing execution of a program of machine-readable instructions on a digital processing apparatus. A signal bearing medium may be embodied by a transmission line, a compact disk, digital-video disk, a magnetic tape, a Bernoulli drive, a magnetic disk, a punch card, flash memory, integrated circuits, or other digital processing apparatus memory device.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus for non-interruptively updating firmware on redundant hardware controllers, the apparatus comprising:
    a routing module configured to route hardware management commands and firmware update commands from a service processor to a primary redundant hardware controller via a shared serial connection, the primary redundant hardware controller being in an active state to execute all hardware management commands received from the service processor via the shared serial connection;
    a receiving module coupled to the routing module, the receiving module configured to receive the hardware management and firmware update commands from the service processor to the primary redundant hardware controller via the shared serial connection;
    a forwarding module coupled to the receiving module, the forwarding module configured to forward the firmware update commands via a dedicated point to point connection from the primary redundant hardware controller to a secondary redundant hardware controller without executing the firmware update commands on the primary redundant hardware controller while the primary redundant hardware controller is in the active state, the secondary redundant hardware controller being configured to receive the firmware update commands over the point to point connection when the secondary redundant hardware controller is in an idle state and the primary redundant hardware controller is in the active state;
    an implementation module configured to execute the firmware update commands on the secondary redundant hardware controller to update a firmware image on the secondary redundant hardware controller, wherein the primary redundant hardware controller executes the hardware management commands concurrently with the execution of the firmware update commands on the secondary redundant hardware controller; and
    a termination module configured to place the secondary redundant hardware controller in the active state and place the primary redundant hardware controller in the idle state after execution of the firmware update commands on the secondary redundant hardware controller;
    wherein the routing module, receiving module, forwarding module, implementation module, and termination module comprise one or more of logic hardware or at least one non-transitory machine-readable storage medium having executable code stored thereon.

2. The apparatus of claim 1, wherein the firmware update commands are associated with a flash update, the apparatus further comprising a determination module, the determination module configured to determine that the primary hardware controller is controlling the shared serial connection and determine whether the secondary hardware controller is operational in response to receiving the flash command from the service processor.

3. The apparatus of claim 2, further comprising an implementation module, the implementation module configured to execute boot block code to update a firmware image on the secondary hardware controller in response to receiving the flash command comprising a flash start command via the dedicated point to point connection.

4. The apparatus of claim 1, wherein after the secondary redundant hardware controller is switched to the active state and the primary redundant hardware controller is switched to the idle state, all firmware update commands are executed on the primary redundant hardware controller and the forwarding module is configured to forward the hardware management commands via the dedicated point to point connection from the primary redundant hardware controller to the secondary redundant hardware controller for execution on the secondary redundant hardware controller without executing the hardware management commands on the primary redundant hardware controller.

5. The apparatus of claim 4, further comprising a write module coupled to the validation module, the write module configured to write a data block associated with a flash data command on the secondary redundant hardware controller.

6. The apparatus of claim 5, further comprising an acknowledgement module coupled to the write module, the acknowledgement module configured to acknowledge receipt of the flash command.

7. The apparatus of claim 1, further comprising a fail module, the fail module configured to send a failure message to the service processor in response to a determination that the secondary redundant hardware controller is non-operational and send a negative acknowledgment to the service processor in response to a determination that the command is invalid.

8. The apparatus of claim 2, further comprising a termination module, the termination module configured to complete a firmware overlay process on the secondary redundant hardware controller in response to receipt of the flash command that comprises a flash end command.

9. A system for non-interruptively updating firmware on redundant hardware controllers, the system comprising:
    a management module, the management module configured to execute a firmware overlay process;
    a primary baseboard management controller coupled to the management module via a hardware control interface, the primary baseboard management controller controlling all operations associated with the redundant hardware controllers, and the primary baseboard management controller being configured to route a flash update from the management module to a synchronization interface without executing the flash update on the primary baseboard management controller in response to the management module executing the firmware overlay process;

a secondary baseboard management controller coupled to the primary baseboard management controller, the secondary baseboard management controller controlling no operations associated with the redundant hardware controllers, and the secondary baseboard management controller being configured to receive the flash update from the primary baseboard management controller via the synchronization interface; and an update module in communication with the primary baseboard management controller and the secondary baseboard management controller, the update module configured to non-interruptively replace a current firmware image stored on the secondary baseboard management controller with the flash update concurrently with operations associated with the redundant hardware controllers being controlled by the primary baseboard management controller;

wherein the management module, primary baseboard management controller, secondary baseboard management controller, and update module receiving module, forwarding module, implementation module, and termination module comprise one or more of logic hardware or at least one non-transitory machine-readable storage medium having executable code stored thereon.

10. The system of claim 9, wherein the primary baseboard management controller and the secondary baseboard management controller comprise a memory device, the memory device configured to store a data block associated with a flash data command.

11. The system of claim 9, wherein the update module comprises an indirect routing connection that couples the management module, the primary baseboard management controller and the secondary baseboard management controller, the indirect routing connection configured to transmit and receive a flash command between the management module and the secondary baseboard management controller through the primary baseboard management controller.

12. A non-transitory machine-readable storage medium tangibly embodying a program of machine-readable instructions executable by a digital processing apparatus to perform operations for non-interruptively updating firmware on redundant hardware controllers, the operations comprising:

receiving at a primary hardware controller hardware management commands and a flash command from a service processor via a shared serial connection, the primary hardware controller being in an active state and having sole control over the shared serial connection to execute all hardware management commands received from the service processor via the shared serial connection, the hardware management commands and flash command intended for execution by the primary hardware controller;

while the primary hardware controller is in the active state, forwarding the flash command from the primary hardware controller to a secondary hardware controller via a synchronization interface without executing the flash command on the primary hardware controller, the secondary hardware controller being in an idle state and having no control over the shared serial connection while the primary hardware controller is in the active state;

updating a firmware image stored on the secondary hardware controller in response to receiving and executing the flash command, wherein updating the firmware image stored on the secondary hardware controller occurs concurrently with the execution of the hardware management commands on the primary hardware controller; and completing a firmware overlay process of the secondary hardware controller, the firmware overlay process comprising switching the primary hardware controller from the active state to an idle state having no control over the shared serial connection and switching the secondary hardware controller from the idle state to an active state having sole control over the shared serial connection after the firmware image on the secondary hardware controller is updated.

13. The non-transitory machine-readable storage medium of claim 12, wherein the operations further comprise determining that a redundant hardware controller is a primary hardware controller in response to the primary hardware controller controlling the shared serial connection to the service processor.

14. The non-transitory machine-readable storage medium of claim 12, wherein the operations further comprise validating the flash command.

15. The non-transitory machine-readable storage medium of claim 14, wherein the operations further comprise writing a validated data block associated with the flash command to a firmware storage location on the secondary hardware controller.

16. The non-transitory machine-readable storage medium of claim 12, wherein the operations further comprise acknowledging receipt of the flash command.

17. The non-transitory machine-readable storage medium of claim 12, wherein the operations further comprise sending a failure message to the service processor in response to a determination that the secondary hardware controller is non-operational and sending a negative acknowledgment to the service processor in response to a determination that the flash command is invalid.

18. The non-transitory machine-readable storage medium of claim 12, wherein:

the state synchronization interface comprises a dedicated point to point connection configured to communicate status information between the primary hardware controller and the secondary hardware controller; and the shared serial connection comprises a hardware control interface.

19. The non-transitory machine-readable storage medium of claim 12, wherein the firmware overlay process comprises:

updating a firmware image stored on the primary hardware controller after the primary hardware controller has been switched to the idle state and the secondary hardware controller has been switched to the active state; and switching the primary hardware controller back to the active state and switching the secondary hardware controller back to the inactive state after the firmware image stored on the primary hardware controller is updated.

20. A method for deploying computing infrastructure, comprising integrating computer readable code into a computing system, the method comprising:

managing client hardware;

receiving hardware management tasks and a flash command at a primary hardware controller from a service processor over a serial connection and forwarding the flash command without executing the flash command, while the primary hardware controller is in an active state having sole control over the serial connection;

receiving the forwarded flash command at a secondary hardware controller from the primary hardware controller via a dedicated point to point connection, while the secondary hardware controller is in an idle state having no control over the serial connection; and executing a firmware overlay process, to perform the additional steps of:

updating a firmware image stored on the secondary hardware controller in response to receiving the flash command concurrently with the execution of hardware management tasks on the primary hardware controller;

after the firmware image stored on the secondary hardware controller is updated, switching the primary hardware controller from the active state to an idle state having no control over the serial connection and switching the secondary hardware controller from the idle state to an active state having sole control over the serial connection;

after switching the primary hardware controller from the active state to the idle state and switching the secondary hardware controller from the idle state to the active state, updating a firmware image stored on the primary hardware controller based on the flash command; and after updating the firmware image stored on the primary hardware controller, switching the primary hardware controller back to the active state from the idle state and switching the secondary hardware controller back to the idle state from the active state.

* * * * *